United States Patent
Luk et al.

(10) Patent No.: US 9,449,208 B2
(45) Date of Patent: Sep. 20, 2016

(54) COMPARTMENTALIZED SMART REFRIGERATOR WITH AUTOMATED ITEM MANAGEMENT

(71) Applicant: PAYPAL, INC., San Jose, CA (US)

(72) Inventors: Bryant Genepang Luk, Round Rock, TX (US); Yu Tang, Round Rock, TX (US); Richard Chapman Bates, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/559,727

(22) Filed: Dec. 3, 2014

(65) Prior Publication Data

US 2016/0162715 A1    Jun. 9, 2016

(51) Int. Cl.
| | |
|---|---|
| *G06F 19/00* | (2011.01) |
| *G06K 15/00* | (2006.01) |
| *G06K 7/10* | (2006.01) |
| *F25D 29/00* | (2006.01) |

(52) U.S. Cl.
CPC ......... *G06K 7/10415* (2013.01); *F25D 29/005* (2013.01)

(58) Field of Classification Search
USPC .......................... 235/375, 383, 385, 451, 492
See application file for complete search history.

(56) References Cited

U.S. PATENT DOCUMENTS

| | | | | |
|---|---|---|---|---|
| 4,241,337 A | * | 12/1980 | Prada | F25D 29/008 200/61.69 |
| 4,368,625 A | | 1/1983 | Platt | |
| 5,982,654 A | * | 11/1999 | Corisis | H01L 25/105 257/E25.023 |
| 5,992,166 A | * | 11/1999 | Tremblay | F25D 17/045 236/49.3 |
| 7,861,542 B2 | * | 1/2011 | Rozendaal | F25D 29/00 236/54 |
| 2001/0045096 A1 | * | 11/2001 | Tatter | F25D 29/00 62/129 |
| 2003/0090890 A1 | * | 5/2003 | Miozza | F25D 17/065 362/92 |
| 2005/0091996 A1 | * | 5/2005 | Ishikawa | B65D 5/42 62/126 |
| 2006/0181961 A1 | | 8/2006 | Hobkirk | |
| 2007/0016852 A1 | | 1/2007 | Kim et al. | |
| 2008/0047282 A1 | * | 2/2008 | Bodin | G06Q 10/08 62/129 |
| 2009/0045680 A1 | * | 2/2009 | Litch | F25D 17/065 307/66 |
| 2009/0266290 A1 | * | 10/2009 | Sliwa | G01N 21/78 116/206 |
| 2010/0324722 A1 | * | 12/2010 | Fritchie | G01N 35/00732 700/214 |
| 2012/0266619 A1 | * | 10/2012 | Shaw | F25D 16/00 62/126 |
| 2013/0052616 A1 | | 2/2013 | Silverstein et al. | |
| 2014/0053581 A1 | * | 2/2014 | Cho | F25D 21/008 62/80 |

FOREIGN PATENT DOCUMENTS

| | | | | |
|---|---|---|---|---|
| EP | 0648428 | | 4/1995 | |
| GB | 2465559 A | * | 5/2010 | ............. A23L 3/365 |

* cited by examiner

*Primary Examiner* — Tuyen K Vo
(74) *Attorney, Agent, or Firm* — Haynes and Boone, LLP

(57) ABSTRACT

A smart refrigerator system includes a plurality of compartments for storing food items and one or more tag readers. The smart refrigerator system may read a tag coupled to a food item using one of one or more tag readers. The smart refrigerator system may determine an identity of the food item, an associated date of the food item, and/or a compartment containing the food item. The smart refrigerator system may track item information that includes the identity of the food item, a state of the food item, and/or a compartment location of the food item. The smart refrigerator system may receive item usage information indicating when a user plans to use the food item and change a temperature of the food item. The smart refrigerator system may also generate a notification regarding freshness and/or a spoilage level of the food item and present it to the user.

20 Claims, 10 Drawing Sheets

COMPARTMENTALIZED SMART REFRIGERATOR WITH AUTOMATED ITEM MANAGEMENT

BACKGROUND

1. Field of the Invention

The present invention relates to refrigerators and, more particularly, to smart refrigerators providing automated management of stored items.

2. Related Art

Refrigerators include a thermally insulated unit and a cooling system to keep contents in the unit at a cooler temperature than the ambient temperature. The cool temperature maintains freshness of food items. Smart refrigerators may provide internet access and maintain a food inventory using a touchscreen display panel. However, the food inventory is typically manually entered by a user through the touchscreen display panel, which can be inconvenient for users.

Figure 1:
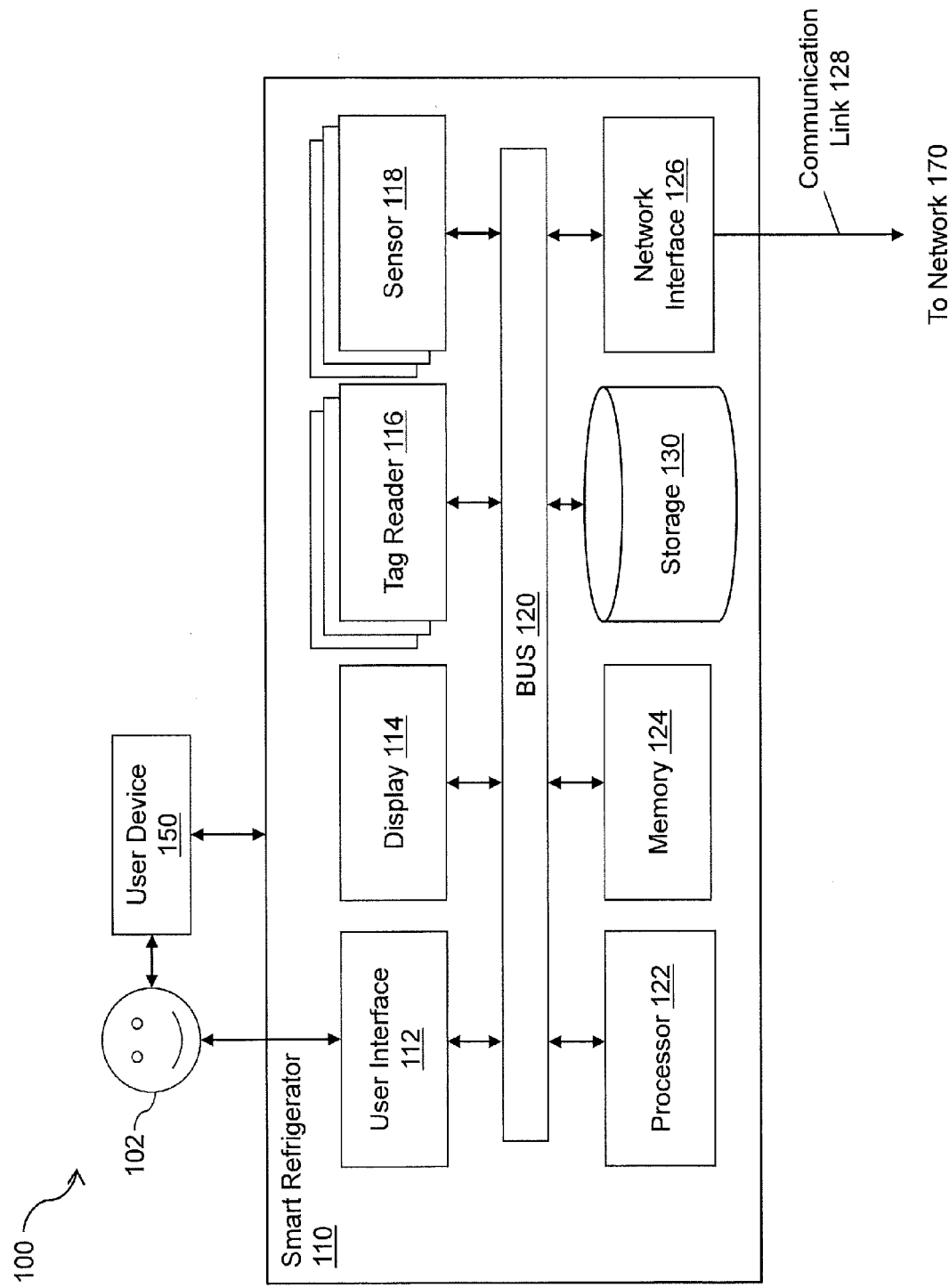
FIG. 1 is a block diagram illustrating a hardware environment supporting a compartmentalized smart refrigerator system providing automated item management according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for a compartmentalized smart refrigerator providing automated item management.

In various embodiments, a smart refrigerator system includes a plurality of compartments for containing food items and one or more tag readers configured to read a tag associated with each food item. Each food item may have an associated tag that is, for example, adhesively attached to the food item, attached to the food item using a tag fastener, included in a container or wrapper of the food item, embedded in the container or wrapper of the food item, or otherwise coupled to the food item. A compartment may be, for example, a shelf, a drawer, a bin, a crisper, a container, a box, or other compartment. Each compartment may include one or more tag readers to provide automatic reading of tags when the food items are placed in the compartments. When a user places food items in the compartments, the smart refrigerator system identifies each food item and an associated date for each food item (e.g., an expiration date, a use by date, a best before date, a sell by date, etc.) in response to the tag readers reading tags coupled to the food items. The smart refrigerator system may further determine which compartment each food item is located in based on which of the tag readers detects the tag for each food item.

In various embodiments, the smart refrigerator system tracks each of the food items stored in the smart refrigerator system in an item database. The smart refrigerator system may track the identity of the food item, an associated date of the food item, a state of the food item including freshness and/or a spoilage level, a compartment at which the food item is located, and/or an amount of the food item that is left. The smart refrigerator system may determine the state of the food item based on, for example, the associated date of the food item, how long after the associated date the food item is fresh or safe to eat, detection of gas produced by deterioration or spoilage of the food item using chemical sensors, a temperature in the refrigerator or a compartment containing the food item, a time at which the food item is opened, a number of times the food item is taken out of the refrigerator, how long an item is outside the refrigerator, and/or an ambient temperature outside the refrigerator while the item is outside.

In various embodiments, the smart refrigerator system may determine item usage information indicating which food items a user plans to use or is expected to use, and when the user, plans to use or is expected to use the food items. For example, the item usage information may indicate that a user may need a certain food item in the near future so should be thawed, or that a user may not need a certain food item in the near future so should be frozen. The user may enter the item usage information on a refrigerator display or on a user device, which transmits the item usage information to the smart refrigerator system. For example, the user may enter which food items the user plans to use for dinner, or may enter a dinner menu so that the smart refrigerator can determine which food items will be needed for such dinner menu. The smart refrigerator system may determine which food items are to be changed in temperature (e.g., thawed, frozen, etc.) based on the item usage information. In an embodiment, each compartment has an independent temperature control such that the temperature of each compartment may be changed. The smart refrigerator system may change the temperature of the compartment containing the food items to be changed in temperature. In other embodiments, the smart refrigerator system may physically move the food items to be changed in temperature or the compartments containing such food items to an area with a different temperature (e.g., a thawing area), for example, using a conveyor system, a robotic hand, or a food item release and chute system.

In various embodiments, the smart refrigerator system may determine that a food item will deteriorate in quality and/or spoil soon, or has deteriorated in quality and/or has spoiled based on tracking the state of each food item. The smart refrigerator system may generate a notification regarding the deterioration in quality/spoiling and present the notification to a user on a refrigerator display or on a user device. The smart refrigerator system may further determine that a user is low on a certain food item (e.g., based on the weight of the item measured by weight sensors and/or an image of the item captured by image sensors, such as a camera), and present the notification to the user on a refrigerator display or on a user device. The smart refrigerator system may provide an option to purchase such food item from a merchant and make a payment through a service provider.

Referring now to FIG. 1, a block diagram 100 of a hardware environment of an exemplary smart refrigerator system 110 is illustrated. Smart refrigerator system 110 may include a bus 120 or other communication mechanism for communicating data, which interconnects subsystems and components, including a user interface 112, a display panel 114, a plurality of tag readers 116, one or more sensors 118, one or more processors or processing components 122 (e.g., a microprocessor, microcontroller, a digital signal processor (DSP), etc.), a system memory component 124 (e.g., RAM), a storage component 130 (e.g., a static storage drive such as ROM), and a network interface circuit 126.

A user 102 may interact with smart refrigerator system 110 using user interface 112. User interface 112, in an embodiment, may include an input component, such as a touchscreen (e.g., touchscreen component of display panel 114), a remote control, a keyboard, or other input component. In an embodiment, user interface 112 may be provided, at least in part, by a graphic user interface (GUI) provided on display panel 114 or a user device 150. User 102 may interact with smart refrigerator system 110 using user device 150 communicatively coupled to smart refrigerator system 110 via a network 170 and/or via short-range wireless communication, such as Bluetooth communications, Near Field Communication (NFC), or Wi-Fi communications.

Display panel 114, in an embodiment, is configured to present visual content. Display panel 114 includes a pixel array. Each pixel may be manipulated and have an address corresponding to its physical coordinates. Display panel 114 may be a light-emitting diode (LED) display panel, organic light-emitting diode (OLED) display panel, liquid-crystal (LCD) display panel, plasma display panel (PDP), cathode ray tube (CRT) display panel, or other display panel. Display panel 114 may be flat or curved, and may have a rectangular shape, round shape, or other shape.

Display panel 114, in an embodiment, may include a touchscreen component to provide user interface 112. User 102 may touch display panel 114 to interact with visual content presented on display panel 114. Touch input may be detected by the touchscreen component based on capacitive or resistive changes in vertical and horizontal conductive lines of the touchscreen component, which traverse display panel 114, at the location of the touch.

One or more tag readers 116, in an embodiment, are configured to read tags coupled to items. Tag readers 116 may be Near Field Communications (NFC) readers or Radio Frequency Identification (RFID) readers configured to read, respectively, NFC tags or RFID tags by transmitting a radio signal to the tags and receiving a modulated signal from the tags. In other embodiments, tag reader 116 may be a barcode scanner configured to scan a barcode, such as a Universal Product Code (UPC), a Quick Response (QR) code, or other barcode. In a further embodiment, tag reader 116 may be a Bluetooth communication device configured to read Bluetooth tags.

Tag readers 116, in an embodiment, may receive information indicating an identity of an item and/or an associated date of the item from a tag coupled to the item. The associated date may include an expiration date, a use by date, a best before date, and/or a sell by date. In another embodiment, tag readers 116 may determine a uniquely assigned item identifier (e.g., a number, letters, or alphanumeric code) in response to receiving a modulated signal or scanning a barcode. The uniquely assigned item identifier may be used to look up the identity of the item and/or the associated date.

Tag readers 116, in an embodiment, are each coupled to a compartment for storing items. Smart refrigerator system 110 may include a plurality of compartments inside the refrigerator and one or more of the compartments may include one or more tag readers 116. In certain embodiments, each of the compartments includes one or more tag readers 116. Each tag reader 116, for example, may be located within, under, behind, in front of, along the edges of, or otherwise disposed on, in, or around the respective compartment. Tag readers 116 may be located at various positions relative to the compartments such that tag readers 116 are capable of reading or scanning tags coupled to items. The plurality of tag readers 116 may include an array of tag readers 116 arranged in rows and columns that span the interior of the refrigerator. However, this is merely exemplary and the tag readers 116 may be arranged in any arrangement or shape and/or may span a part of the refrigerator. In another embodiment, tag readers 116 are located on the outside of the refrigerator, such as on a door of the refrigerator.

Tag readers 116, in an embodiment, include an NFC transceiver circuitry or an RFID transceiver circuitry, and may also include, respectively, an NFC antenna or an RFID antenna. NFC readers and NFC tags, RFID readers and RFID tags, and/or other readers and tags may implement standards such as ECMA-340 (NFCIP-1), ECMA-352 (NFCIP-2), ISO/IEC 18000 ISO/IEC 18092, ISO/IEC 21481, ISO/IEC 14443, ISO/IEC 14443A, ISO/IEC 14443B, ISO/IEC 15693, JIS X6319-4, and FeliCa. However, it is contemplated that other short-range wireless communication technologies and standards (e.g., Bluetooth low energy, etc.) may be utilized and fall within the scope of the present disclosure. One of ordinary skill in the art will recognize that the use of NFC and/or RFID between tag readers 116 and tags may be advantageously utilized to provide for low power communication, and also provide an automated identification of items.

Each tag reader 116, in an embodiment, is configured to detect a tag coupled to an item when the tag is within the range of tag reader 116 (e.g., within 2 cm, within 5 cm, within 10 cm, within 20 cm, etc.). Each tag reader 116 may create a communication area in which a tag is detected. The communication area may cover, for example, a spherical region around tag reader 116. When the tag is placed in the communication area of tag reader 116, tag reader 116 may detect the tag and exchange data with the tag.

One or more sensors 118, in an embodiment, include temperature sensors configured to measure and monitor a temperature. One or more of the compartments for storing food items may include a temperature sensor configured to measure the temperature in the respective compartments. A temperature sensor may also be placed on or outside the refrigerator to measure the ambient temperature outside the refrigerator. In another embodiment, sensors 118 may include chemical sensors configured to detect and monitor the air for chemical substances produced by spoiling of perishable food items. For example, items may deteriorate and/or be spoiled by chemical reactions and/or microorganisms (e.g., bacteria, fungi, such as yeast or mold, etc.) and produce gas that are emitted from the items into the air. One or more of the compartments for storing food items may include a chemical sensor configured to detect and monitor the air in the respective compartments for gas emitted by the items. In a further embodiment, one or more of the compartments for storing items may include a weight sensor configured to determine a weight of the items in the respective compartments, an image sensor (e.g., a visible light camera) configured to capture an image of the items in the respective compartments, and/or a motion sensor configured to detect opening and closing of the respective compartments. In certain embodiments, each of the compartments of smart refrigerator system 110 may include a temperature sensor, a chemical sensor, a weight sensor, an image sensor and/or a motion sensor.

In accordance with embodiments of the present disclosure, smart refrigerator system 110 performs specific operations by processor or processing component 122 executing one or more sequences of one or more instructions contained in system memory component 124. Such instructions may be read into system memory component 124 from another computer readable medium, such as storage component 130. These may include instructions, for example, to operate tag readers 116 to detect a tag coupled to an item within its respective communication area and read the tag to determine an identity of the item. In other embodiments, hard-wired circuitry may be used in place of or in combination with software instructions for implementation of one or more embodiments of the disclosure.

Storage component 130, in an embodiment, contains one or more databases for storing item data and information, such as an identity of the item, description of the item, associated date of the item, and/or other item information. Storage component 130 may also contain one or more databases for user data and information, such as personal information (e.g., user login, user's age, user's location, etc.), user account information, user interest data, sensor data (e.g., sensor data from sensors of user device 150), and/or other user data and information. Storage component 130 may store an association between each tag reader 116 and a respective compartment to which each tag reader 116 is coupled. In another embodiment, storage component 130 is configured to store an address for each tag reader 116, which may correspond to its physical coordinates.

Processor 122, in an embodiment, may use one of one or more tag readers 116 to detect a tag coupled to an item, identify the item, and determine an associated date of the item by receiving item-related information (e.g., associated dates of the item). Processor 122 may determine a compartment containing the item based on which tag reader 116 detects the tag. In another embodiment, processor 122 may use tag reader 116 located outside the refrigerator to identify the item and determine which compartment contains the item based on which container had been opened (e.g., using motion sensors).

Processor 122, in an embodiment, may receive chemical data from a chemical sensor of a compartment for containing food items, compare the chemical data with data for a corresponding type of food item in a chemical database on storage component 130, and determine a state of the items, such as food quality and food spoilage of the food items in the compartment. In another embodiment, processor 122 may receive weight data from a weight sensor of a compartment for containing food items and determine a quantity of the food items in the compartment.

Smart refrigerator system 110, in an embodiment, includes network interface circuit 126 that is coupled to network 170. Smart refrigerator system 110 may transmit and receive data, information, messages, and instructions, including one or more programs (i.e., application code), through network interface circuit 126 and a communication link 128. Smart refrigerator system 110 may also include other components, such as a Bluetooth device, NFC device, and/or a Wi-Fi device configured to communicate with user device 150.

Figure 2A:
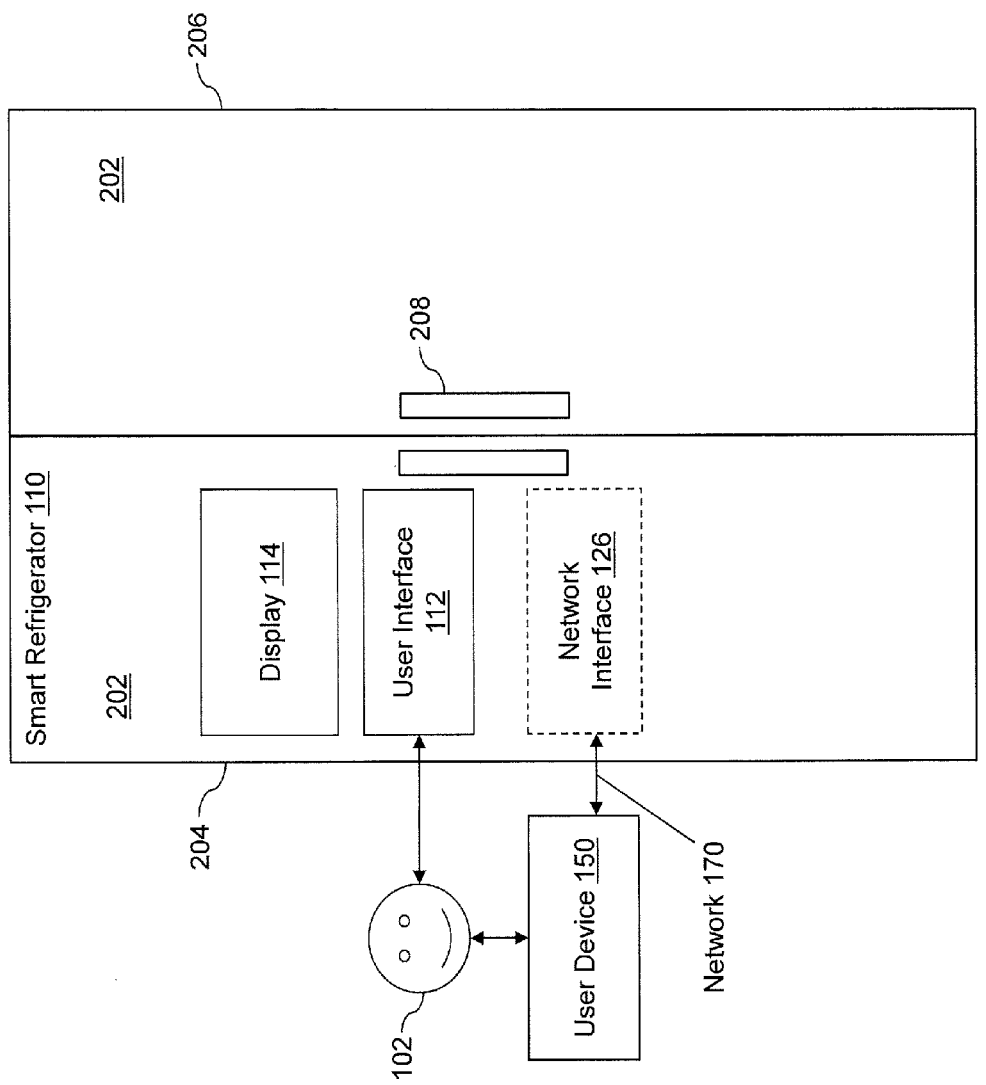
FIGS. 2A, 2B, 2C, 2D and 2E are diagrams illustrating various aspects of a compartmentalized smart refrigerator system providing automated item management according to various embodiments of the present disclosure.

Referring now to FIG. 2A, a diagram of a front side elevational view of smart refrigerator system 110 with its doors 202 closed is illustrated according to an embodiment of the present disclosure. In an embodiment, smart refrigerator system 110 includes doors 202 for a freezer side 204 and a refrigeration side 206, and handles 208 for each door 202. Display panel 114 and/or user interface 112 may be mounted on a side of smart refrigerator system 110, such as on door 202. Smart refrigerator system 110 may include network interface circuit 126 (which may not be visible from the exterior) to provide network connectivity to user interface 112 and/or communicate with a user device, such as user device 150.

Figure 2B:
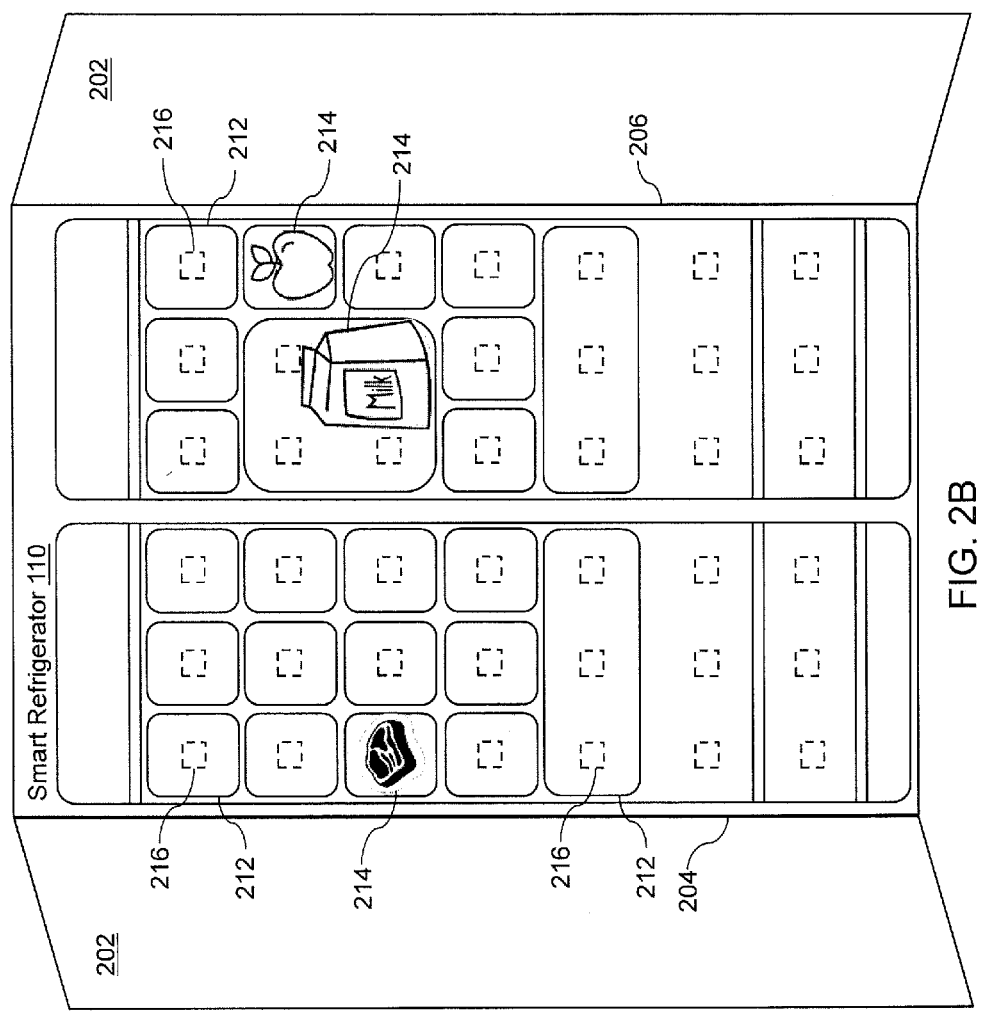

Referring now to FIG. 2B, a diagram of a front side elevational view of a smart refrigerator system 110 with its doors 202 open is illustrated according to an embodiment of the present disclosure. In an embodiment, smart refrigerator system 110 includes a plurality of compartments 212 containing food items 214 and one or more tag readers 216. The plurality of compartments 212 may include a shelf, a drawer, a bin, a crisper, a container, a box, and/or other compartments.

Each compartment 212, in an embodiment, may include one or more tag readers 216 configured to detect tags coupled to food items 214. Each compartment 212 may be configured to have independent temperature control such that each compartment 212 is capable of being set at a different temperature from another compartment. Each compartment 212 may include a temperature sensor, one or more independently controlled fans, and one or more air vents and/or ducts. Each compartment 212 may be insulated and/or include a heating component (e.g., using a heating element or microwave) to provide further temperature control. A processor, such as processor 122, may determine a target temperature of item 214 and operate compartment 212 to change the temperature of the compartment containing item 214.

Each compartment 212, in an embodiment, may include a shutter system to shut the one or more air vents and/or ducts. A processor, such as processor 122, may determine that item 214 in compartment 212 has spoiled and operate compartment 212 containing item 214 to seal compartment 212 by shutting the air vents and/or ducts. Accordingly, smart refrigerator system 110 may quarantine item 214 to prevent or deter the spread of microorganisms to other compartments 212 (e.g., bacteria, fungi, such as yeast or mold, etc.). However, this is merely exemplary and it is contemplated that the compartment may be sealed by other suitable mechanisms known in the art.

Figure 2C:
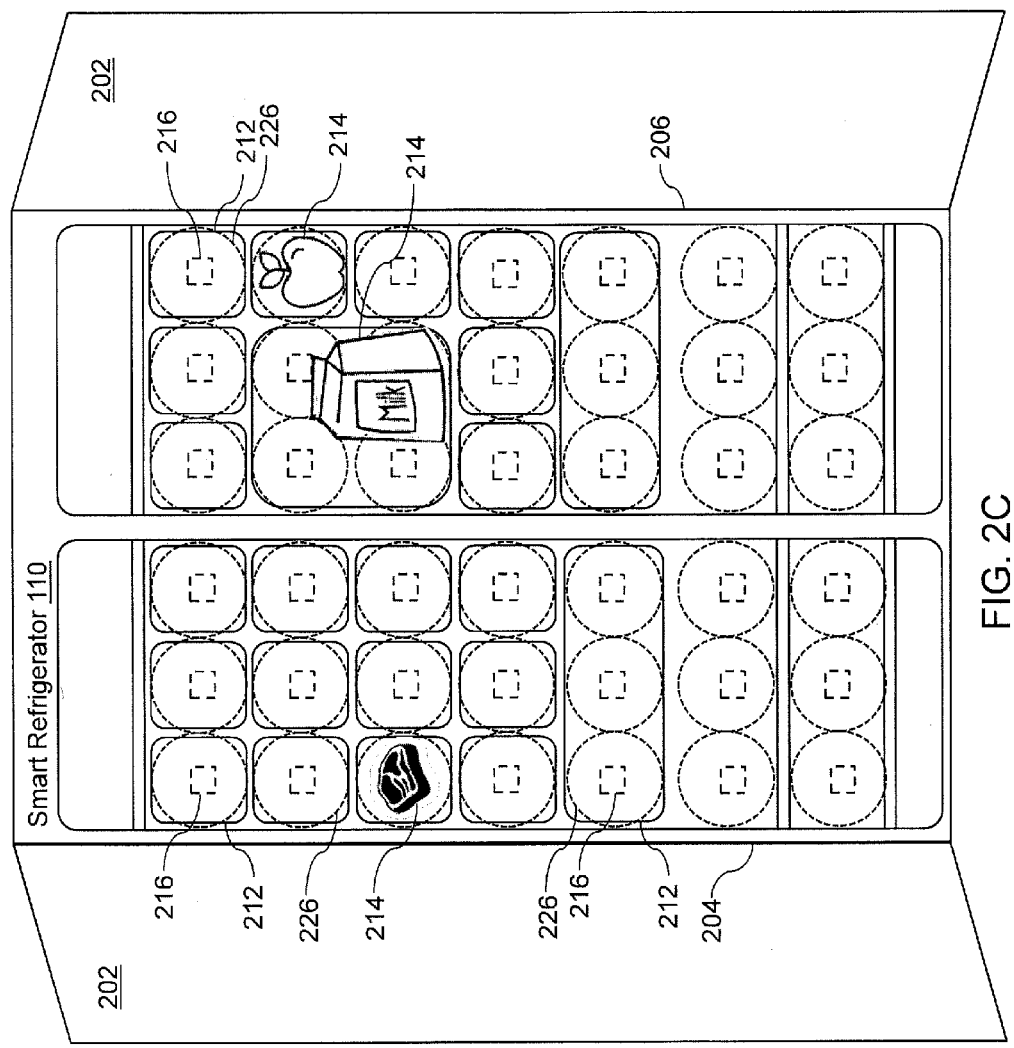

Referring now to FIG. 2C, a diagram showing communication areas 226 of respective tag readers 216 of smart refrigerator system 110 is illustrated according to an embodiment of the present disclosure. Dashed lines are used for communication areas 226 to indicate that communication areas 226 may not be visible (as in FIG. 2B). In an embodiment, communication areas 226 are regions in the vicinity of respective tag readers 216, such as an area enclosed by a range of each tag reader 116. Tag readers 116 may have a predetermined range (e.g., 2 cm, 5 cm, 10 cm, 20 cm, etc.). The range of tag readers 216 may be configured depending on how compacted or spread apart tag readers 216 are arranged from each other. Smart refrigerator system 110 may identify item 214 coupled to a tag and determine which compartment contains the item 214, such as by a compartment location, based on which of tag readers 216 detects the tag.

Figure 2D:
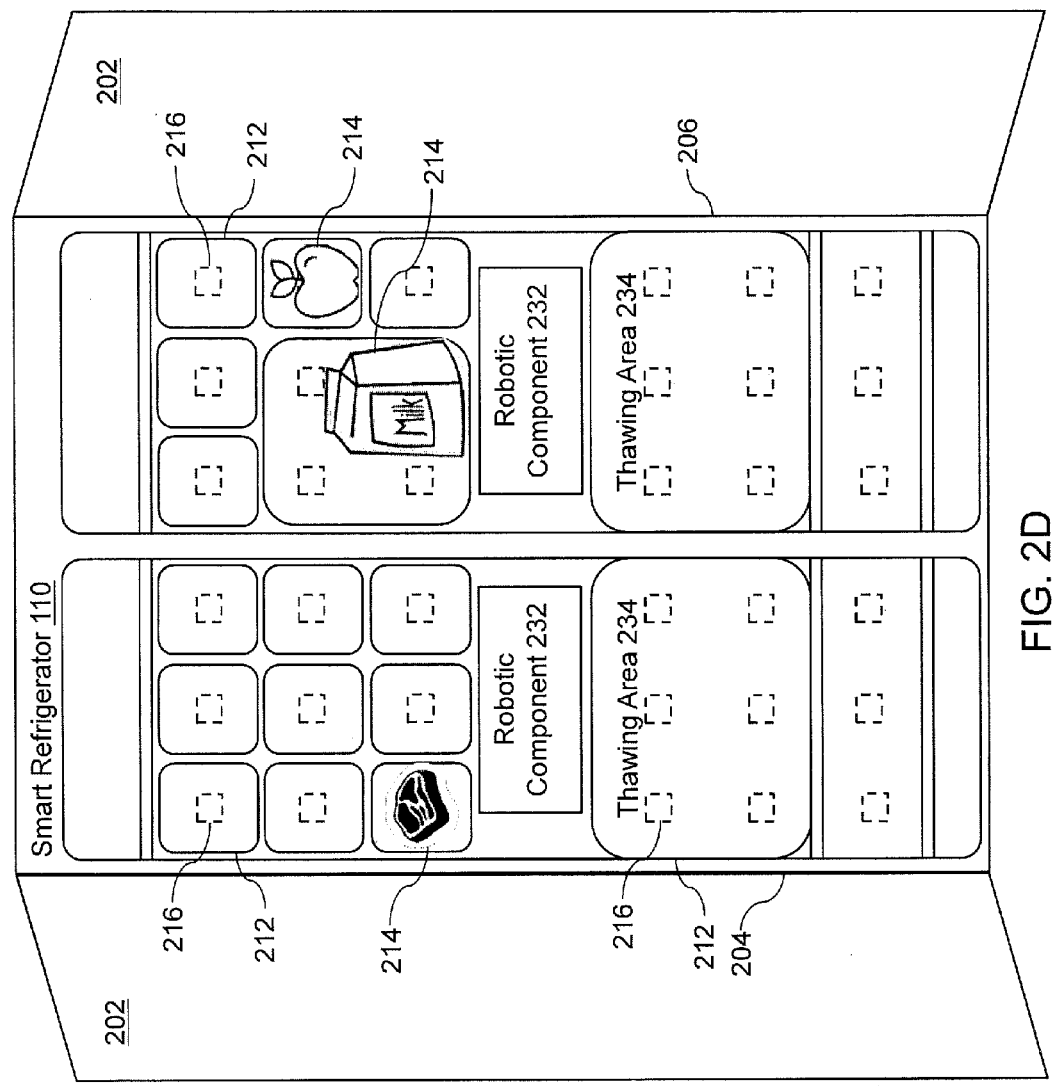

Referring now to FIG. 2D, a diagram of a front side elevational view of a smart refrigerator system 110 with its doors 202 open is illustrated according to an embodiment of the present disclosure. In an embodiment, smart refrigerator system 110 includes a plurality of compartments 212 containing food items 214, one or more tag readers 216, a robotic component 232, and one or more areas with a different temperature from other areas of the refrigerator, such as thawing area 234.

In an embodiment, robotic component 232 includes a conveyor system and a rail system on which compartments 212 may be moved. A processor, such as processor 122, may decide to change a temperature of item 214 and operate the conveyor system to move compartment 212 containing item 214 to an area with a different temperature, such as thawing area 234. In another embodiment, robotic component 232 may include a robotic hand configured to hold item 214 or compartment 212. In an example, the robotic hand may move item 214 out of compartment 212 and move it to another compartment or an area with a different temperature. In another example, the robotic hand may move compartment 212 to an area with a different temperature. A processor, such as processor 122, may decide to change a temperature of item 214 and operate the robotic hand to move item 214 or compartment 212 containing item 214 to an area with a different temperature, such as thawing area 234. However, these mechanisms for robotic component 232 are merely exemplary, and robotic component 232 may implement other mechanisms known in the art suitable to move compartments 212 and/or items 214.

In a further embodiment, a processor, such as processor 122, may determine that item 214 in compartment 212 has spoiled and operate robotic component 232 to move item 214 or compartment 212 containing item 214 to a quarantine area or quarantine compartment. Accordingly, smart refrigerator system 110 may quarantine item 214 to prevent or deter the spread of microorganisms to other compartments 212 (e.g., bacteria, fungi, such as yeast or mold, etc.).

Figure 2E:
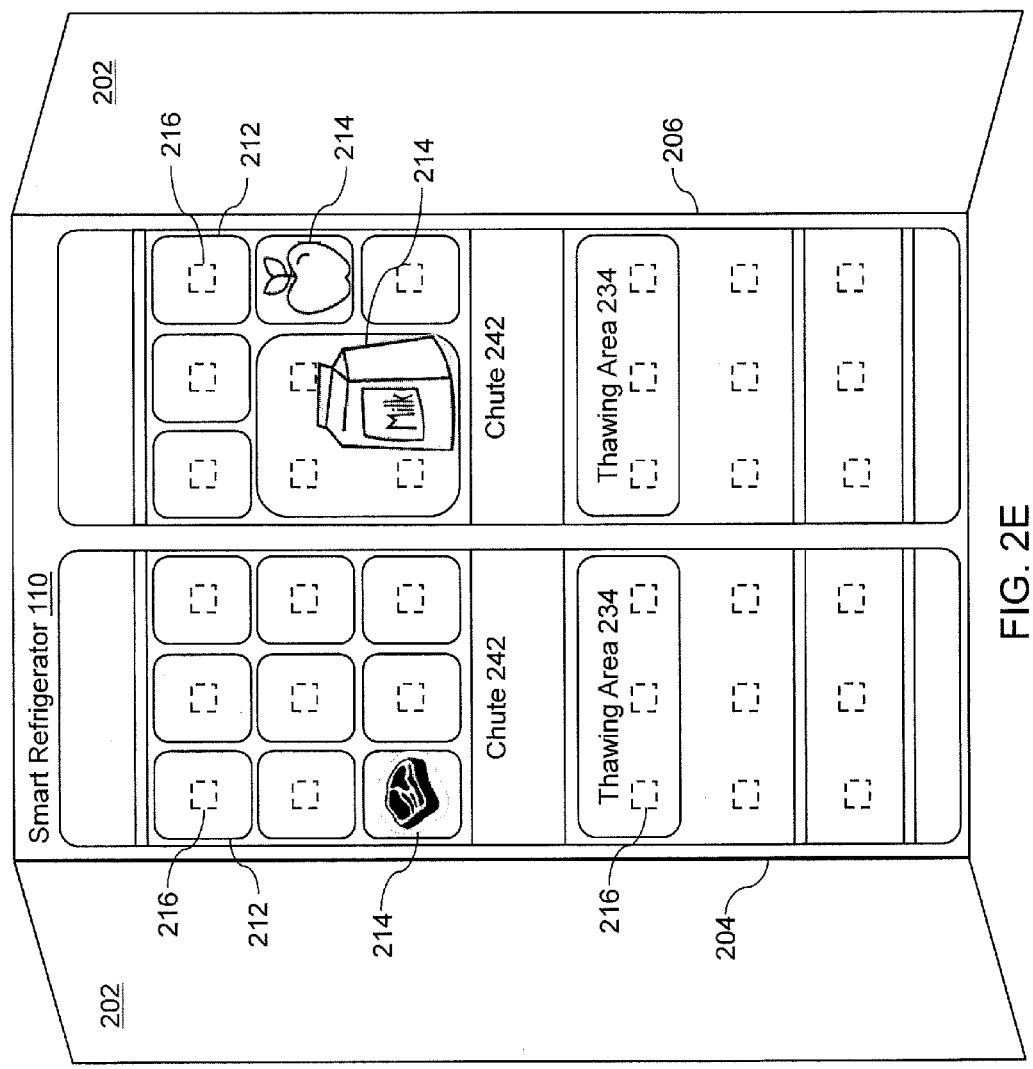

Referring now to FIG. 2E, a diagram of a front side elevational view of a smart refrigerator system 110 with its doors 202 open is illustrated according to an embodiment of the present disclosure. In an embodiment, smart refrigerator system 110 includes a plurality of compartments 212 containing food items 214, one or more tag readers 216, a chute system 242, one or more areas with a different temperature from other areas of the refrigerator, such as thawing area 234. In an embodiment, one or more compartments 212 include an opening below or on the side of compartments 212, a movable cover structure covering the opening, a dispensing system configured to move cover to release items 214 contained in compartments 212 into chute system 242. Chute system 242 guides released items 214 to an area with a different temperature, such as thawing area 234.

Figure 3:
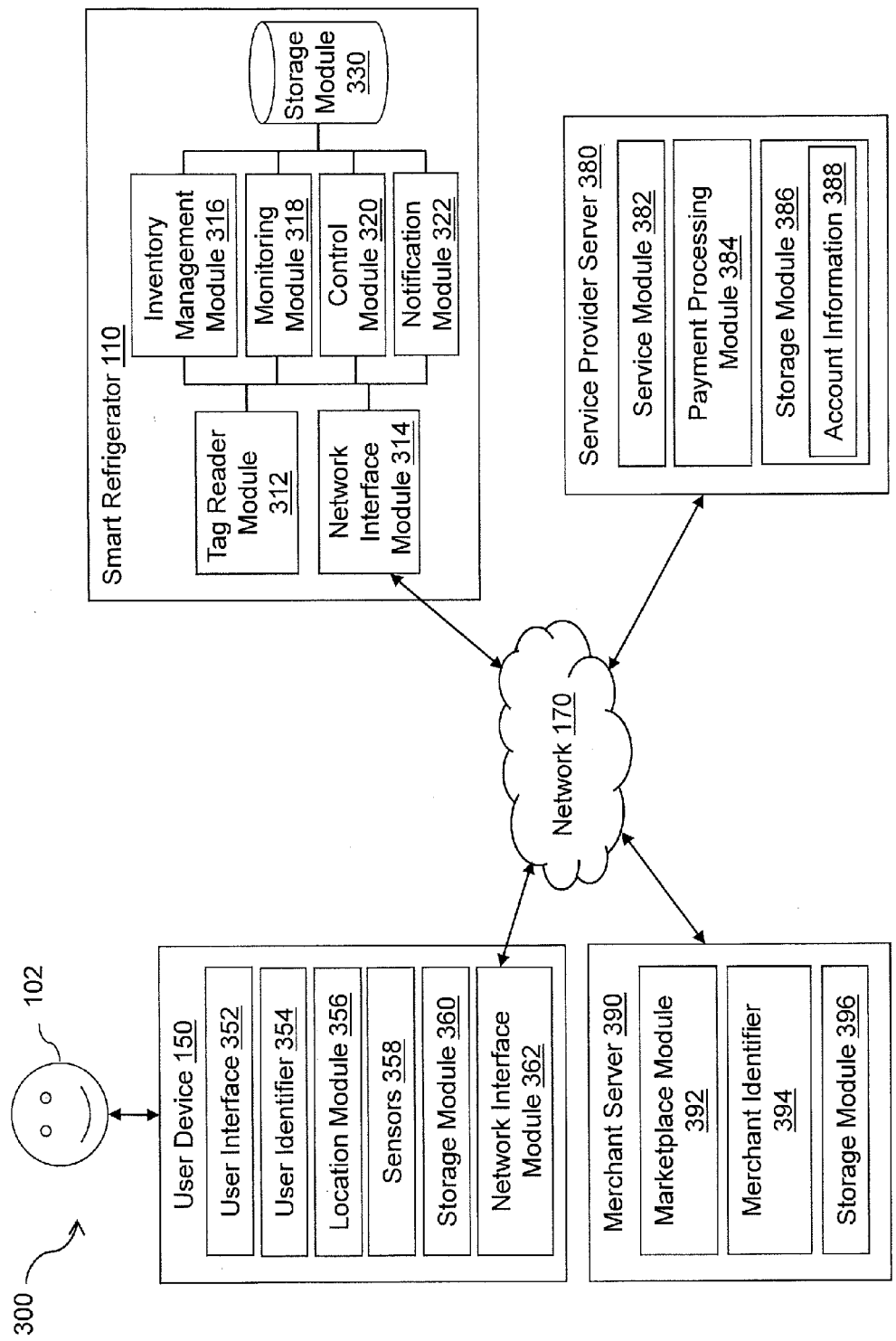
FIG. 3 is a block diagram illustrating a networked system according to an embodiment of the present disclosure.

Referring now to FIG. 3, an embodiment of a network-based system 300 for implementing one or more processes described in the present disclosure is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes smart refrigerator system 110, one or more user devices 150 (e.g., a mobile phone, a smartphone, a wearable device, etc.), one or more service provider servers or devices 380 (e.g., network server devices), and one or more merchant servers or devices 390 in communication over network 170. Network 170, in one embodiment, may be implemented as a single network or a combination of multiple networks. For example, in various embodiments, network 170 may include the Internet and/or one or more intranets, landline networks, wireless networks, and/or other appropriate types of communication networks. In another example, network 170 may comprise a wireless telecommunications network (e.g., cellular phone network) adapted to communicate with other communication networks, such as the Internet. As such, in various embodiments, smart refrigerator system 110, user device 150, service provider server 380, and merchant server 390 may be associated with a particular link (e.g., a link, such as a URL (Uniform Resource Locator) to an IP (Internet Protocol) address).

Smart refrigerator system 110, in various embodiments, includes tag reader modules 312 configured to read or scan tags coupled to items and a network interface module 314 that is communicatively coupled to network 170. Tag reader modules 312 and network interface module 314 may be communicatively coupled to any or all of an inventory management module 316, a monitoring module 318, a control module 320, and a notification module 322, any of which may be coupled to a storage module 330. Any or all of the modules may be implemented as a subsystem of smart refrigerator system 110 including a circuit, a hardware component, a hardware subcomponent, and/or a variety of other subsystems known in the art. For example, any or all of the modules 312, 314, 316, 318, 320, 322, and 330 may be implemented using any or all of the hardware components described in FIG. 1. Furthermore, any or all of the modules may be preconfigured to perform their disclosed functionality, or may be configured by a processing system "on-the-fly" or as needed to perform their disclosed functionality. As such, any or all of the modules may include pre-configured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

Tag reader modules 312 may be included as a separate module provided in smart refrigerator system 110, or may include communications hardware (e.g., antennas) and instructions stored on a computer-readable medium that, when executed by a processing system in smart refrigerator system 110, configure tag reader modules 312 to operate the communications hardware to read or scan tags coupled to items, as well as provide any of the other functionality that is discussed herein. In an embodiment, tag reader modules 312 may be implemented, at least in part, as tag readers 116 in FIG. 1. Network interface module 314 may be included as a separate module provided in smart refrigerator system 110, or may include communications hardware (e.g., antennas) and instructions stored on a computer-readable medium that, when executed by a processing system in smart refrigerator system 110, configure network interface module 314 to operate the communications hardware to send and receive information over network 170, as well as provide any of the other functionality that is discussed herein. In an embodiment, network interface module 314 may be implemented, at least in part, as network interface circuit 126 in FIG. 1.

Inventory management module 316 may be included as a separate module provided in smart refrigerator system 110, or may be provided using instructions stored on a computer-readable medium that, when executed by a processing system in smart refrigerator system 110, configure inventory management module 316 to operate tag reader module 312 to track item information for an item including an identity of the item, a state of the item, quantity of the item, and/or a location of the compartment containing the item, and store the item information in an item inventory database on storage module 330, as well as provide any of the other functionality that is discussed herein. Monitoring module 318 may be included as a separate module provided in smart refrigerator system 110, or may be provided using instructions stored on a computer-readable medium that, when executed by a processing system in smart refrigerator system 110, configure monitoring module 318 to monitor a state of an item based on an associated date of the item, how long after the associated date the item is fresh or safe, detection of gas produced by deterioration or spoilage of the item using chemical sensors, a number of times a door of the refrigerator is opened and closed, a temperature of the refrigerator or the compartment containing the item, a time at which the item is first opened or taken outside the refrigerator, a number of times the item is taken outside, how long an item is outside, and/or a temperature outside while the item is outside, as well as provide any of the other functionality that is discussed herein. Control module 320 may be included as a separate module provided in smart refrigerator system 110, or may be provided using instructions stored on a computer-readable medium that, when executed by a processing system in smart refrigerator system 110, configure control module 320 to operate temperature control of a compartment or operate a robotic component (e.g., a conveyor system or a robotic hand) to change a temperature of an item, as well as provide any of the other functionality that is discussed herein. Notification module 322 may be included as a separate module provided in smart refrigerator system 110, or may be provided using instructions stored on a computer-readable medium that, when executed by a processing system in smart refrigerator system 110, configure notification module 322 to generate a notification based on item information for an item and provide the notification to user 102, such as by presenting the notification on display panel 114 or on user device 150, as well as provide any of the other functionality that is discussed herein.

Other modules discussed herein but not illustrated in FIG. 3 may be provided as separate modules on smart refrigerator system 110, or using instructions stored on a computer-readable medium similarly as discussed above. While storage module 330 has been illustrated as located in smart refrigerator system 110, one of skill in the art will recognize that it may include multiple storage modules and may be connected to other modules through network 170 without departing from the scope of the present disclosure. In an embodiment, storage module 330 may be implemented as storage component 130 in FIG. 1.

User device 150, in various embodiments, may be utilized by user 102 to interact with smart refrigerator system 110 over network 170. User device 150 may also be utilized by user 102 to interact with service provider server 380 and/or merchant server 390 over network 170. User device 150 may be implemented using any appropriate combination of hardware and/or software configured for wired and/or wireless communication over network 170. In various embodiments, user devices 150 may include at least one of a smartphone, wireless cellular phone, satellite phone, tablet, laptop computer, notebook computer, hybrid/convertible computer, and/or other types of mobile computing devices. In other embodiments, user devices 150 may include at least one of a wearable device, such as an activity tracker (e.g., a fitness tracker, a health tracker, etc.), smart watch, eyeglasses with appropriate computer hardware resources, and/or other types of wearable computing devices. User devices 150 may include a user interface module 352, one or more user identifiers 354, a location module 356, one or more sensors 358, a storage module 360, and a network interface module 362.

In various implementations, user 102 is able to input data and information into an input component (e.g., a touchscreen, a keyboard, a microphone, etc.) of user device 150 to provide personal information, user interest information, user identification information, and other user data and/or information.

User interface module 352, in an embodiment, may be utilized by user 102 to access applications, to view data or information on a display, and to conduct transactions (e.g., shopping, purchasing, bidding, etc.) with service provider server 380 and/or merchant server 390 over network 370. In one aspect, user 102 may login to an account associated with user 102 and purchase expenses may be directly and/or automatically debited from the account via user interface module 352.

In one implementation, user interface module 352 includes a software program, such as a graphical user interface (GUI), executable by a processor that is configured to interface and communicate with service provider server 380 via network 170. In another implementation, user interface module 352 comprises a browser module that provides a network interface to browse information available over network 170. For example, user interface module 352 may be implemented, in part, as a web browser to view information available over network 170.

In an example, user 102 is able to access merchant websites via one or more merchant servers 390 to view and select items for purchase, and the user 102 is able to purchase items from one or more merchant servers 390 via service provider server 380. Accordingly, in one or more embodiments, user 102 may conduct transactions (e.g., purchase and provide payment for one or more items) from one or more merchant servers 390 via service provider server 180.

User device 150, in an embodiment, may include other modules as may be desired in one or more embodiments of the present disclosure to provide additional features available to user 102. In one example, such other modules may include security modules for implementing client-side security features, programmatic client applications for interfacing with appropriate application programming interfaces (APIs) over network 170, and/or various other types of generally known programs and/or software modules. In still other examples, the other modules may interface with user interface module 352 for improved efficiency and convenience.

One or more user identifiers 354, in an embodiment, may be implemented, for example, as operating system registry entries, cookies associated with user interface module 352, identifiers associated with hardware of user device 150, or various other appropriate identifiers. User identifier 354 may include one or more attributes related to user 102, such as personal information related to user 102 (e.g., one or more of names, user names, passwords, photograph images, biometric IDs, addresses, phone numbers, a social security number, etc.), banking information, financial information, and/or funding source information (e.g., one or more banking institutions, credit card issuers, user account numbers, security data and information, etc.). In various embodiments, identifier data that includes user identifier 354 may be transmitted from user device 150 to smart refrigerator system 110 via network. In other embodiments, identifier data that includes user identifier 354 may be transmitted with a user login request (e.g., user login data) to service provider server 380 via network 170, and service provider server 380 may use the identifier data to associate user 102 with a particular user account maintained by service provider server 380.

Location module 356, in an embodiment, determines, tracks, monitors, and/or provides an instant geographical location of user device 150. In one implementation, the geographical location may include GPS coordinates, zip-code information, area-code information, street address information, and/or various other generally known types of location data or information. In various embodiments, location data may be automatically obtained and/or provided by user device 150 via an internal or external monitoring component, such as global positioning system (GPS), which uses satellite-based positioning, assisted GPS (A-GPS), which uses cell tower information to improve reliability and accuracy of GPS-based positioning, and Wi-Fi-based positioning. In other embodiments, location data may be obtained based on communications between user device 150 and a device at the location, such as smart refrigerator system 110 in FIG. 1 or a check-in device (e.g., a beacon device). This may help to save battery life and allow for better indoor location. In further embodiments, location information may be directly entered into user device 150 by user 102 via a user input component, such as a keyboard, touch display, and/or voice recognition microphone.

Sensors 358, in an embodiment, may include an accelerometer, a gyroscope, a pedometer, a heart rate monitor, one or more cameras, and other sensors. An accelerometer that measures acceleration and a gyroscope that measures orientation may be used together to measure movement, orientation, and/or activity of user device 150. A pedometer may measure the number of steps taken by user 102. A heart rate monitor may measure a heart rate of user 102. A camera may be used by user 102 to take pictures. The camera may be used to take pictures of food items and/or scan barcodes coupled to the food items. Sensors 358 may generate sensor data in response to the measurements. A processor of user device 150 may receive the sensor data by accessing and/or communicating with sensors 358. The processor of user device 150 may process, analyze, infer from, and/or interpret the sensor data to generate further sensor data, or determine other data or information based on the sensor data. For example, user device 150 may determine calories burned based on the activity, the steps taken, and/or the heart rate. In another example, user device 150 may determine an identity of a food item, nutritional value, associated dates of the food item, or other item information by accessing an item information database (e.g., on service provider server 380) based on the picture of the food item or the scanned barcode. Such determination may supplement tag reader modules 312 of smart refrigerator system 110 identifying food items when the food item is not coupled to a tag (e.g., fruits or vegetables that may not be tagged).

Storage module 360, in an embodiment, may store data and information. Storage module 360 may contain one or more databases in which to store the data and information. User device 150 may locally store user account information and/or sensor data in a database on storage module 360.

Network interface module 362, in an embodiment, communicates with other devices or servers over network 170. For example, user device 150 may communicate with smart refrigerator system 110, service provider server 380, and merchant server 390 via network interface module 362 exchanging data with a network interface module of respective devices or servers over network 170.

In one aspect, when interfacing with user device 150, user 102 may elect and/or consent to provide personal information, user interest data, sensor data, location data, and/or other user data or information to service provider server 380 and/or merchant server 390. User 102 may set or configure the user settings/configuration menu of user interface module 352 of user device 150. Through the user settings/configuration menu, user 102 may provide consent to share user data or information and the extent of shared user data or information. User device 150 may transmit shared user data or information dynamically by push synchronization, periodically, or each time an application associated with service provider server 380 or merchant server 390 is opened by user 102. In some embodiments, user 102 may be prompted for permission to release user data or information. Accordingly, user 102 may have exclusive authority to allow transmission of personal information, user interest data, sensor data, and/or location data from the user device 150 to service provider server 380 and/or merchant server 390.

Service provider server 380, in one embodiment, may be maintained by a service provider, such as an online service provider or a transaction processing entity that provides processing for financial transactions and/or information transactions between user 102 and one or more of merchant servers 390. As such, service provider server 380 includes a service module 382, which may be adapted to interact with the user device 150 over network 170 to facilitate the searching, selection, purchase, and/or payment of items by user 102 from one or more merchant servers 390. In one example, service provider server 380 may be provided by PayPal® Inc. or eBay® Inc. in San Jose, Calif., USA, and/or one or more financial institutions or a respective intermediary that may provide multiple point of sale devices at various locations to facilitate transaction routings between merchants and, for example, financial institutions.

Service module 382, in one embodiment, utilizes a payment processing module 384 to process purchases and/or payments for financial transactions between user 102 and each of merchant servers 390. In one implementation, payment processing module 384 assists with resolving financial transactions through validation, delivery, and settlement. As such, service module 382 in conjunction with the payment processing module 384 settles indebtedness between user 102 and each of merchant servers 390, wherein accounts may be directly and/or automatically debited and/or credited of monetary funds in a manner as accepted by the banking industry.

Service provider server 380, in one embodiment, may be configured to maintain one or more user accounts and merchant accounts in an account database on storage module 386, each of which may include account information 388 associated with one or more individual users (e.g., user 102) and merchants. For example, account information 388 may include private financial information of user 102 and merchants (e.g., one or more merchants associated with merchant servers 390), such as one or more account numbers, passwords, credit card information, banking information, or other types of financial information, which may be used to facilitate financial transactions between user 102, and one or more merchants associated with merchant servers 390. Account information 388 may also include personal information, such as one or more contact information (e.g., phone number, address, email, etc.) and other account IDs of user 102 that are maintained by third parties (e.g., user names or account numbers). In various aspects, the methods and systems described herein may be modified to accommodate users and/or merchants that may or may not be associated with at least one existing user account and/or merchant account, respectively.

In one implementation, user 102 may have identity attributes stored with service provider server 380, and user 102 may have credentials to authenticate or verify identity with service provider server 380. User attributes may include personal information, banking information and/or funding source information. In various aspects, the user attributes may be passed to service provider server 380 as part of a login, search, selection, purchase, and/or payment request, and the user attributes may be utilized by service provider server 380 to associate user 102 with one or more particular user accounts maintained by service provider server 380.

One or more merchant servers 390, in various embodiments, may be maintained by one or more business entities that offer various items, such as goods and/or services, for purchase and payment (e.g., a supermarket, a grocery store, a drugstore, a convenience store, a farmers market, a discount retailer, a restaurant, a café, or other merchant) or, in some cases, by a partner of a business entity that processes transactions on behalf of business entities. The business entities may maintain a merchant website through which the various items are offered for purchase and payment. In some embodiments, business entities may need registration of user identity information as part of offering items to user 102 over network 170. As such, each of one or more merchant servers 390 may include a merchant database on a storage module 396 for identifying available items, which may be made available, at least in part, to smart refrigerator system 110 and/or user device 150 for viewing and purchase by user 102. In one or more embodiments, user 102 may complete a transaction such as purchasing the items via service provider server 380.

Each of merchant servers 390, in one embodiment, may include a marketplace module 392, which may be configured to provide data or information to smart refrigerator system 110 and/or user device 150 over network 170. For example, marketplace module 392 may transmit item data or information to smart refrigerator system 110, which presents the item data or information on display panel 114 or user device 150. User 102 may interact with marketplace module 392 through user interface 112 of smart refrigerator system 110 and/or user interface module 352 of user device 150 to search and view various items available for purchase in the merchant database on storage module 396.

Each of merchant servers 390, in one embodiment, may include at least one merchant identifier 394, which may be included as part of the one or more items made available for purchase so that, for example, particular items are associated with particular merchants. In one implementation, merchant identifier 394 may include one or more attributes and/or parameters related to the merchant, such as business and banking information. Merchant identifier 394 may include attributes related to merchant server 390, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 390 via service provider server 380 over network 170.

A merchant website, in an embodiment, may be maintained by a merchant and communicate (e.g., using merchant server 390) with service provider server 380 over network 170. For example, the merchant website may communicate with service provider server 380 in the course of various services offered by service provider server 380 to the merchant website, such as payment intermediary between customers of the merchant website and the merchant website itself. The merchant website may use an application programming interface (API) that allows it to offer sale of goods in which customers are allowed to make payment through service provider server 380, while user 102 may have an account with service provider server 380 that allows user 102 to use service provider server 380 for making payments to merchants that allow use of authentication, authorization, and payment services of service provider server 380 as a payment intermediary. The merchant website may also have an account with service provider server 380.

Figure 4:
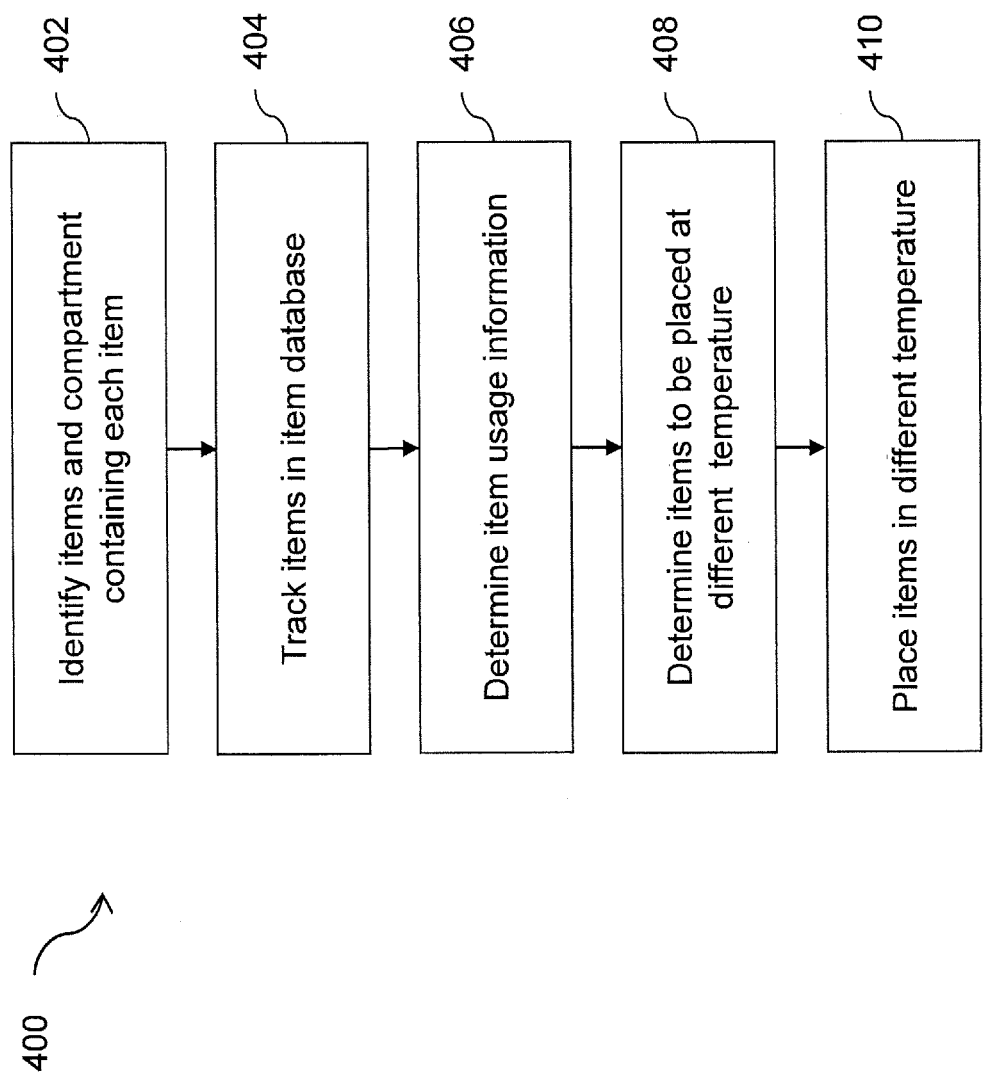
FIG. 4 is a flowchart showing an illustrative method for managing item inventory according to an embodiment of the present disclosure.

Referring now to FIG. 4, a flowchart 400 of a method for managing items stored in compartments of a refrigerator is illustrated according to an embodiment of the present disclosure.

At block 402, smart refrigerator system 110 identifies food items and determines which compartment contains each of the food items. In an embodiment, user 102 may bring food items, each coupled to a tag, to smart refrigerator system 110 and place the food items in at least one of a plurality of compartments of smart refrigerator system 110. One or more of the compartments may include one or more tag readers 116, such as NFC readers or RFID readers, configured to automatically read tags, such as NFC tags or RFID tags, within its communication area (e.g., within 2 cm, within 5 cm, within 10 cm, within 20 cm, etc.). For example, each of the compartments may include one or more tag readers 116. Each tag reader 116 may have a communication area that is an area or a part of an area inside its respective compartment. Smart refrigerator system 110 (e.g., using processor 122 and/or inventory management module 316) may determine an identity of each food item in response to at least one of tag readers 116 reading the tag coupled to the food item, which may include receiving identifying data from a tag. Smart refrigerator system 110 may further determine which compartment contains each item based on which of the tag readers 116 read the tag coupled to each item.

In another embodiment, food items may be coupled to a tag, such as a barcode (e.g., UPC, QR code, etc.), and user 102 may scan the tag using tag reader 116, such as a barcode reader, located at a convenient location, such as on a door of smart refrigerator system 110, before placing the food items in compartments. Smart refrigerator system 110 may determine an identity of each food item based on tag reader 116 scanning a uniquely assigned item identifier from the tag (e.g., UPC, QR code, etc.), which is in turn used to look up item information from a database stored on smart refrigerator system 110, on service provider server 380, and/or merchant server 390. One or more of the compartments may have a weight sensor, a motion sensor, and/or an image sensor configured to detect that an item has been placed inside. Accordingly, smart refrigerator system 110 may further determine which compartment contains each item.

At block 404, smart refrigerator system 110 tracks food items in an item database. In an embodiment, smart refrigerator system 110 (e.g., using processor 122 and/or inventory management module 316) may track item information that includes an identity of each food item and a location of the compartment containing each food item in an item database on storage component 130. Smart refrigerator system 110 may also track an amount of each food item that is left (e.g., using weight sensors of each compartment) and other food item-related information, such as a state of each food item (e.g., quality and spoilage level of each food item).

At block 406, smart refrigerator system 110 determines item usage information. In an embodiment, smart refrigerator system 110 (e.g., using processor 122 and/or control module 320) may receive item usage information item indicating that user 102 plans to use certain food items at a certain time from user 102. User 102 may enter item usage information indicating what food items user 102 may need and when user 102 may need such food items on display panel 114 of smart refrigerator system 110. User 102 may also enter the item usage information on user device 150, which may transmit the item usage information to smart refrigerator system 110. In other embodiments, item usage information indicates that user 102 is expected to use the item at a time based on item usage history of a user, which may be when user 102 had used certain food items in the past.

User 102 may provide item usage information that includes a specific food item (e.g., chicken frozen in a compartment of freezer) or a menu item. User 102 may further provide item usage information that includes a specific time (e.g., by 6 pm) or a general meal time (e.g., breakfast, lunch, dinner) at which user 102 needs the food items. If user 102 provides a menu item (e.g., chicken soup), smart refrigerator system 110 may look up recipes from a recipe database stored on smart refrigerator system 110, service provider server 380, and/or merchant server 390 to determine which food items (e.g., chicken and vegetables) user 102 will need. If there are food items needed for the menu item that user 102 does not have in smart refrigerator system 110, the smart refrigerator system 110 may notify user so that user may buy such food items. In some embodiments, smart refrigerator system 110 provides the option to buy food items that user 102 does not have from merchant server 390 via display panel 114 of smart refrigerator system 110 or via user device 150.

At block 408, smart refrigerator system 110 determines food items to be placed at a different temperature. In an embodiment, smart refrigerator system 110 (e.g., using processor 122 and/or control module 320) may determine which food items needed by user 102 at a certain time need to be placed at a different temperature based on the usage information. For example, smart refrigerator system 110 may receive item usage information that includes a menu item (e.g., chicken soup), determine food items needed for the item menu (e.g., chicken and vegetables), and determine food items that must be placed at a different temperature (e.g., frozen chicken must be thawed) and food items that do not need to be placed at a different temperature (e.g., vegetables can be left at refrigerated temperature).

At block 410, smart refrigerator system 110 places food items in a different temperature. In an embodiment, smart refrigerator system 110 includes compartments capable of being set at different temperatures using independent temperature controls, as described in FIG. 2B. Smart refrigerator system 110 (e.g., using processor 122 and/or control module 320) may operate temperature controls of compartments containing the food items to be placed at a different temperature to change the temperature of the compartment. In another embodiment, smart refrigerator system 110 includes robotic component, such as robotic component 232 as described in FIG. 2D. Smart refrigerator system 110 may operate robotic component 232 (e.g., a conveyor system or a robotic hand) to move the food items or compartments containing the food items to an area with a different temperature. In a further embodiment, smart refrigerator system 110 includes compartments capable of releasing contained food items, such as chute system 242 as described in FIG. 2E. Smart refrigerator system 110 may operate chute system 242 to release and drop the food items to an area with a different temperature.

Figure 5:
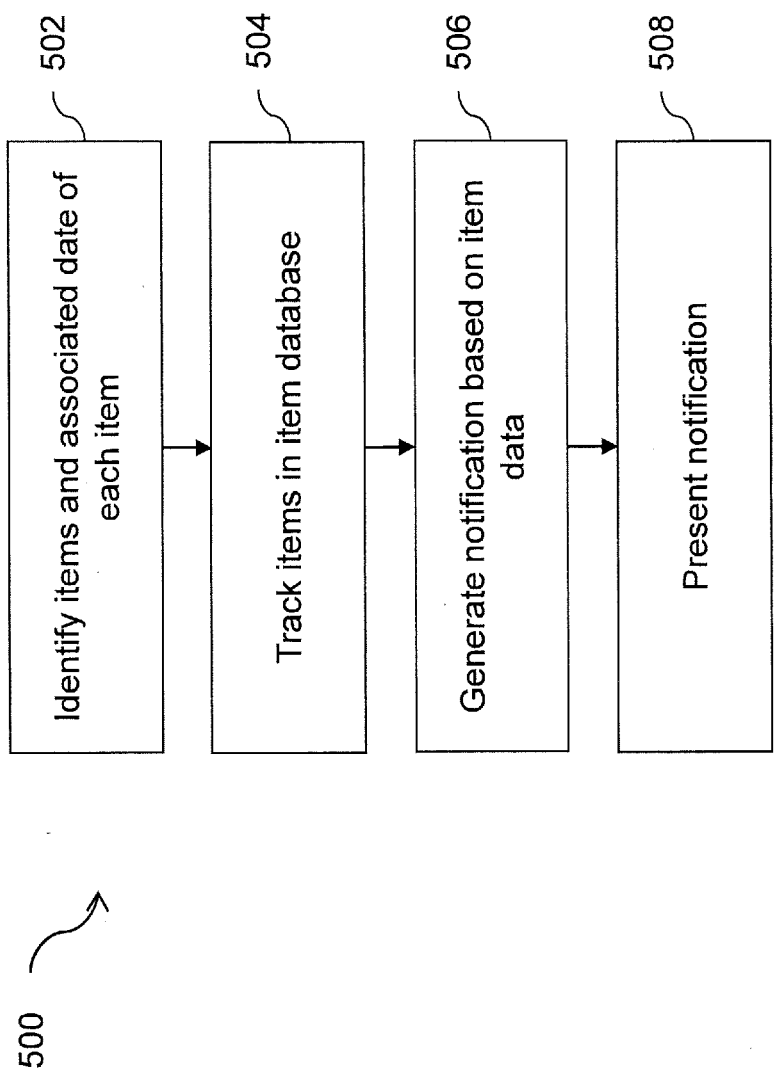
FIG. 5 is a flowchart showing an illustrative method for managing items stored in compartments according to an embodiment of the present disclosure.

Referring now to FIG. 5, a flowchart 500 of a method for managing item inventory is illustrated according to an embodiment of the present disclosure.

At block 502, smart refrigerator system 110 identifies items and an associated date of each item, such as an expiration date, a use by date, a best before date, and/or a sell by date. In an embodiment, user 102 may place the food items coupled to tags in at least one of a plurality of compartments of smart refrigerator system 110. One or more compartments may include one or more tag readers 116, such as NFC readers or RFID readers, configured to automatically read tags, such as NFC tags or RFID tags, within its communication area (e.g., within 2 cm, within 5 cm, within 10 cm, within 20 cm, etc.). For example, each of the compartments may include one or more tag readers 116. Each tag reader 116 may have a communication area that is an area or a part of an area inside its respective compartment. Smart refrigerator system 110 (e.g., using processor 122 and/or inventory management module 316) may determine an identity of each food item and an associated date of each food item in response to at least one of tag readers 116 reading the tag coupled to the item, which may include receiving identifying data and associated date data from a tag.

In another embodiment, food items may be coupled to a tag, such as a barcode (e.g., UPC, QR code, etc.), and user 102 may scan the tag using tag reader 116, such as a barcode reader, located at a convenient location, such as on a door of smart refrigerator system 110, before placing the food items in compartments. Smart refrigerator system 110 may determine an identity of each food item and an associated date of each food item based on tag reader 116 scanning a uniquely assigned item identifier from a tag (e.g., UPC, QR code, etc.), which is in turn used to look up the identity and the associated date from a database stored on smart refrigerator system 110, on service provider server 380, and/or merchant server 390.

At block 504, smart refrigerator system 110 tracks items in an item database. In an embodiment, smart refrigerator system 110 (e.g., using processor 122 and/or inventory management module 316) may track item information that includes an identity of each food item and a state of each food item in an item database on storage component 130. In some embodiments, refrigerator system 110 may further track an amount of each food item (e.g., using weight sensors and/or image sensors).

The state of each food may include freshness of the food item, which relates to the quality of the food item, and/or a spoilage level of the food item, which relates to food safety. Smart refrigerator system 110 may determine the state of each food item based on the associated date of the food item, how long after the associated date the food item is fresh or safe to eat, detection of gas produced by deterioration or spoilage of the item using chemical sensors, a temperature in the refrigerator or a compartment containing the food item, a time at which the food item is opened, a number of times the food item is taken outside of the refrigerator, how long an item is outside, and/or an ambient outside temperature while the item is outside. Smart refrigerator system 110 may access a freshness/spoilage database to determine how long after the associated date the food item is fresh or safe to eat and other freshness/spoilage-related information to determine the state of each food item.

At block 506, smart refrigerator system 110 generates a notification based on the item information. In an embodiment, smart refrigerator system 110 (e.g., by processor 122 and/or notification module 322) generates a notification relating to freshness and/or spoilage of a food item. For example, if a food item (e.g., milk) will be going bad in the near future at a certain time (e.g., 3 days from today), smart refrigerator system 110 may generate a notification indicating that the food item will go bad at the certain time. The amount of time in advance that smart refrigerator system 110 notifies user 102 of a food item going bad may depend on the type of the food item, an amount of the food item left (e.g., earlier warning if there is a large amount of the food item left), or other food item-related information. In some embodiments, smart refrigerator system 110 may generate a notification that a food item has spoiled, and further quarantine the food item. For example, smart refrigerator system 110 may seal a compartment containing the spoiled food item by operating a shutter system of compartment (e.g., a shutter system of compartment 212 as described in FIG. 2B). In another example, smart refrigerator system 110 may operate a robotic component (e.g., robotic component 232 as described in FIG. 2D) to move the compartment or the food item to a quarantine area.

In another embodiment, smart refrigerator system 110 may further suggest a menu item for a meal so that food item soon to deteriorate in quality and/or spoil will be used before then. For example, if refrigerated meat will spoil in 3 days, smart refrigerator system 110 may suggest a menu item that includes the meat so that user 102 uses the meat before spoiling. Smart refrigerator system 110 may search for relevant menus and their ingredients, for example, on service provider server 380 via network 170.

In a further embodiment, smart refrigerator system 110 generates a notification when user 102 has only a small amount of a food item left and will soon run out. Smart refrigerator system 110 may include in the notification an option to buy food item that user 102 is low on from merchant server 390 via display panel 114 of smart refrigerator system 110 or via user device 150.

At block 508, smart refrigerator system 110 presents the notification to user 102. In an embodiment, smart refrigerator system 110 (e.g., by processor 122 and/or notification module 322) transmits notification data to display panel 114 of smart refrigerator system 110 and/or user device. User 102 may view the notification and use the food items accordingly to avoid deterioration in quality or spoiling of the food items.

Figure 6:
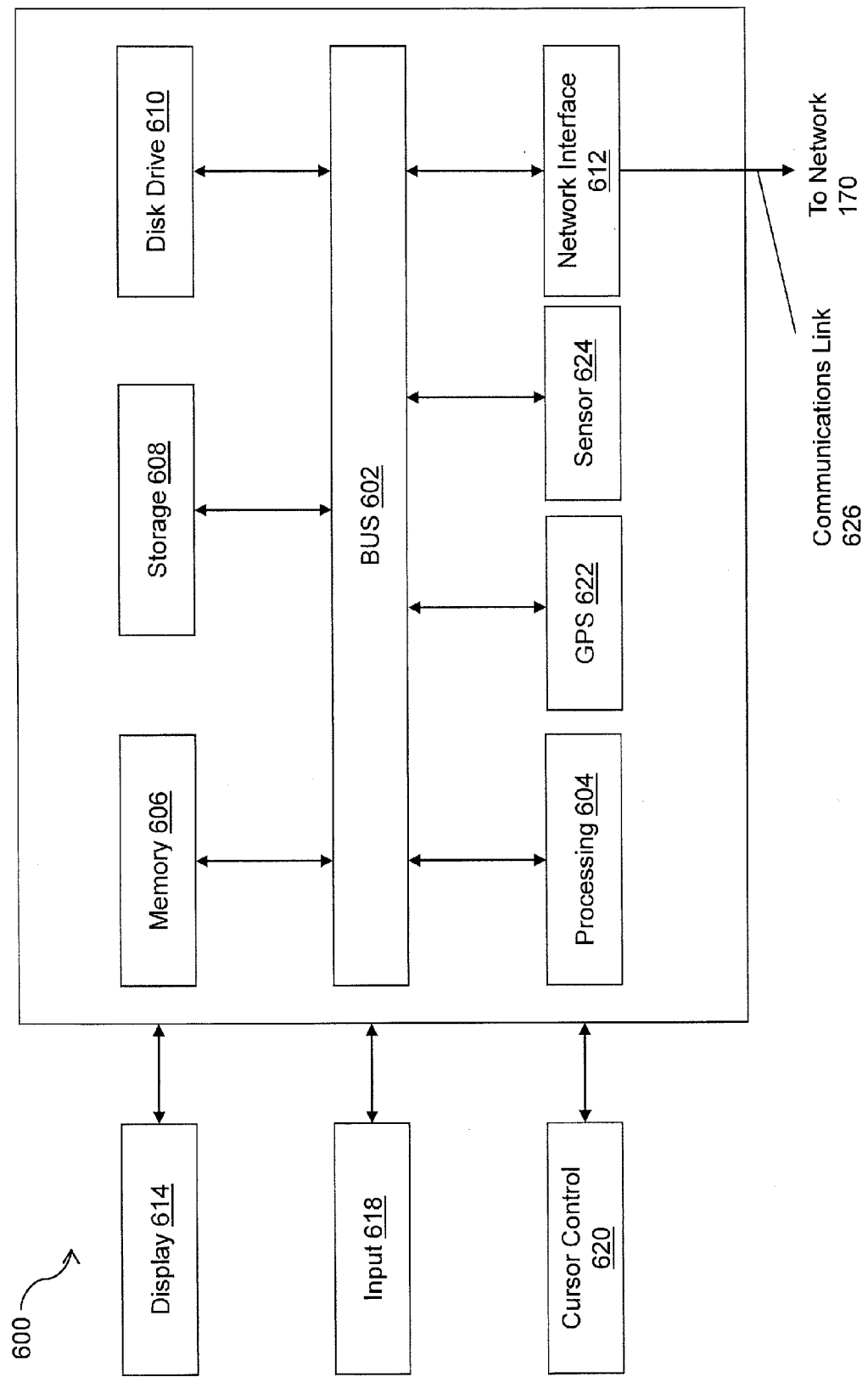
FIG. 6 is a block diagram of a system for implementing one or more components in FIGS. 1 and/or 3 according to an embodiment of the present disclosure.

Referring now to FIG. 6, an embodiment of a computer system 600 suitable for implementing, for example, the smart refrigerator system, user device, service provider server, and merchant server is illustrated. It should be appreciated that other devices utilized by users, service providers, and/or merchants in the system discussed above may be implemented as computer system 600 in a manner as follows.

In accordance with various embodiments of the present disclosure, computer system 600, such as a computer and/or a network server, includes a bus 602 or other communication mechanism for communicating information, which interconnects subsystems and components, such as a processor or processing component 604 (e.g., microprocessor, microcontroller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., light-emitting diode (LED) display component, organic light-emitting diode (OLED) component, liquid-crystal (LCD) display component, plasma display panel (PDP), cathode ray tube (CRT) display component, or other display component), an input component 618 (e.g., keyboard, keypad, virtual keyboard, touchscreen, etc.), a cursor control component 620 (e.g., mouse, pointer, trackball, etc.), a location determination component 622 (e.g., a Global Positioning System (GPS) device as illustrated, a cell tower triangulation device, and/or a variety of other location determination devices known in the art), and/or a sensor component 624. In one implementation, disk drive component 610 may include a database having one or more disk drive components.

In accordance with various embodiments of the present disclosure, computer system 600 performs specific operations by processor 604 executing one or more sequences of instructions contained in system memory component 606, such as described herein with respect to the smart refrigerator system, user device, service provider server, and merchant server. Such instructions may be read into system memory component 606 from another computer readable medium, such as static storage component 608 or disk drive component 610. In other embodiments, hard-wired circuitry may be used in place of, or in combination with, software instructions to implement the present disclosure.

Logic may be encoded in a computer readable medium, which may refer to any medium that participates in providing instructions to processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by a communication link 626 to the network 170 (e.g., such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 626 and network interface component 612. Network interface component 612 may include an antenna, either separate or integrated, to enable transmission and reception via communication link 626. Received program code may be executed by processor 604 as received and/or stored in disk drive component 610 or some other non-volatile storage component for execution.

In view of the present disclosure, it will be appreciated that various devices, systems, and methods have been described according to one or more embodiments for providing interaction between a user device and an interactive display system using near field communications.

Although various components and steps have been described herein as being associated with smart refrigerator system 110, one or more user devices 150, service provider server 380, merchant server 390 of FIGS. 1 and/or 3, it is contemplated that the various aspects of such devices and servers illustrated in FIGS. 1 and/or 3 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A smart refrigerator system, comprising:
a plurality of compartments, each of the compartments having an independent temperature setting and configured to contain one or more items;
one or more tag readers configured to read one or more tags;
a network interface component coupling the system to a network;
a non-transitory memory; and
one or more hardware processors coupled to the non-transitory memory and configured to read instructions from the non-transitory memory to cause the system to perform operations comprising:
receiving item information corresponding to the one or more tag readers reading a tag associated with an item in a first compartment;
determining, in response to the receiving the item information, a target temperature for the item;
adjusting a temperature setting of the first compartment to a first temperature based on the target temperature;
receiving, via the network interface component from a user device, item usage information indicating a time the item is to be used;
determining the item requires a second temperature to facilitate usage; and
adjusting the temperature setting of the first compartment to the second temperature based on the time the item is to be used.

2. The system of claim 1, wherein each of the compartments comprise at least one of the one or more tag readers, and wherein the operations further comprise determining the first compartment contains the item based on which of the one or more tag readers read the tag.

3. The system of claim 2, wherein the receiving of the item information comprises transmitting a radio signal to the tags and receiving a modulated signal from the tags.

4. The system of claim 1, wherein a temperature setting of a second compartment is set at a different temperature from the first temperature.

5. The system of claim 1, further comprising a conveyor system configured to move the first compartment, and wherein the adjusting of the temperature setting of the first compartment to the second temperature comprises moving, by the conveyor system, the first compartment to an area with the second temperature.

6. The system of claim 1, wherein the first compartment is further configured to release the items, and wherein the operations further comprise releasing, by the first compartment, the item thorough a chute system configured to guide the released item to an area.

7. The system of claim 1, wherein the item usage information indicates that a user plans to use the item at the time or that the user is expected to use the item at the time based on an item usage history or a user input of the user.

8. A smart refrigerator system, comprising:
a plurality of compartments, each of the compartments operable to be selectively coupled to an air passage and configured to contain one or more items;
one or more tag readers configured to read one or more tags;
one or more chemical sensors configured to detect spoilage-produced gas;
a non-transitory memory; and
one or more hardware processors coupled to the non-transitory memory and configured to read instructions from the non-transitory memory to cause the system to perform operations comprising:
receiving item information corresponding to the one or more tag readers reading a tag associated with an item in a first compartment;
tracking a state of the item;
detecting the item has spoiled based on the one or more chemical sensors detecting the spoilage-produced gas from the item; and
sealing, in response to the detecting the item has spoiled, the first compartment such that the first component is sealed from the air passage.

9. The system of claim 8, wherein:
the state of the item comprises a freshness level of the item, a spoilage level of the item, or both;
the state of the item is based on an associated date, a length of time after the associated date the item is usable, a length of time the item is in the first compartment, a temperature in the first compartment, a time at which the item is opened, a number of times the item is taken outside the first compartment, a length of time the item is outside the first compartment, a temperature outside the first compartment while the item is outside the first compartment, or a combination thereof; and
the associated date comprises an expiration date, a use by date, a best before date, a sell by date, or a combination thereof.

10. The system of claim 8, wherein each of the compartments comprise at least one of the one or more chemical sensors, wherein the detecting the item has spoiled is based on which of the one or more chemical sensors detected the spoilage-produced gas, and wherein the state of the items is further based on whether the spoilage-produced gas is detected.

11. The system of claim 8, wherein the system further comprises a network interface component coupling the system to a network, and wherein the operations further comprise:
generating a notification based on the status of the item; and
transmitting, via the network interface component, the notification to a user device.

12. A method, comprising:
reading, by a processing system using one of one or more tag readers, a tag coupled to an item in a first compartment of a refrigerator;
determining, by the processing system in response to the reading, a target temperature of the item;
adjusting, by the processing system, a temperature setting of the first compartment to a first temperature based on the target temperature, wherein each compartment of the refrigerator has independent temperature settings;
determining, by the processing system, item usage information for the item indicating a time the item is to be used;
determining, by the processing system, the item requires a second temperature to facilitate usage; and
changing, by the processing system, a temperature of the item to the second temperature based on the time the item is to be used.

13. The method of claim 12, further comprising:
tracking, by the processing system in a non-transitory memory system, item information comprising an identity of the item, a state of the item, a location of the first compartment containing the item, or a combination thereof;
generating, by the processing system, a notification based on the state of the item; and
presenting, by the processing system, the notification on a refrigerator display panel or a user device.

14. The method of claim 13, wherein:
the state of the item comprises a freshness level of the item, a spoilage level of the item, or both;
the state of the item is based on an associated date, a length of time after the associated date the item is usable, a length of time the item is in the first compartment, a temperature in the first compartment, a time at which the item is first taken out of the refrigerator, a number of times the item is taken outside the refrigerator, a length of time the item is outside the refrigerator, a temperature outside the refrigerator while the item is outside the refrigerator, or a combination thereof; and
the associated date comprises an expiration date, a use by date, a best before date, a sell by date, or a combination thereof.

15. The method of claim 12, wherein each compartment comprises at least one of the one or more tag readers, and wherein the method further comprises determining the first compartment contains the item based on which of the one or more tag readers read the tag.

16. The method of claim 12, wherein the tag comprises a near field communication (NFC) tag or a radio field identification (RFID) tag, wherein the one or more tag readers comprise one or more NFC readers or RFID readers, and wherein the reading comprising transmitting a radio signal to the tag and receiving a modulated signal from the tag.

17. The method of claim 12, wherein the changing comprises at least one of:
changing, by the processing system, the temperature setting of the first compartment to the second temperature;
moving, by the processor system operating a conveyor system, the first compartment or the item to an area with the second temperature; or
releasing, by the processing system opening the first compartment, the item to the area with the second temperature.

18. The method of claim 12, wherein the item usage information indicates that a user plans to use the item at the time or that the user is expected to use the item at the time based on an item usage history or a user input of the user.

19. The method of claim 12, the method further comprising:
monitoring, by the processing system using one or more chemical sensors, air for spoilage-produced gas;
determining, by the processing system, the item is spoiled based on the monitoring; and quarantining, by the processing system, the item by sealing the first compartment and/or moving the item or the first compartment to a quarantine area.

20. The method of claim 19, wherein each compartment comprises at least one of the one or more chemical sensors, and wherein the determining the item is spoiled is based on which of the one or more chemical sensors detected the spoilage-produced gas.

* * * * *